(12) United States Patent
Kolstad et al.

(10) Patent No.: US 10,974,439 B2
(45) Date of Patent: Apr. 13, 2021

(54) PROCESS FOR PRODUCING AN ORIENTED FILM COMPRISING POLY(ETHYLENE-2,5-FURANDICARBOXYLATE)

(71) Applicant: Synvina C.V., Amsterdam (NL)

(72) Inventors: Jeffrey John Kolstad, Amsterdam (NL); Jesper Gabriël Van Berkel, Amsterdam (NL)

(73) Assignee: Furanix Technologies B.V., Amsterdam (NL)

( * ) Notice: Subject to any disclaimer, the term of this patent is extended or adjusted under 35 U.S.C. 154(b) by 506 days.

(21) Appl. No.: 15/505,664

(22) PCT Filed: Aug. 25, 2015

(86) PCT No.: PCT/NL2015/050593
§ 371 (c)(1),
(2) Date: Feb. 22, 2017

(87) PCT Pub. No.: WO2016/032330
PCT Pub. Date: Mar. 3, 2016

(65) Prior Publication Data
US 2017/0297256 A1 Oct. 19, 2017

Related U.S. Application Data

(60) Provisional application No. 62/041,309, filed on Aug. 25, 2014.

(30) Foreign Application Priority Data

Aug. 25, 2014 (NL) ..................................... 2013360

(51) Int. Cl.
*B29C 55/12* (2006.01)
*B32B 27/32* (2006.01)
*B29C 55/00* (2006.01)
*C08J 5/18* (2006.01)
*B32B 27/36* (2006.01)
*B29C 55/04* (2006.01)
*B29K 67/00* (2006.01)

(52) U.S. Cl.
CPC ............ *B29C 55/12* (2013.01); *B29C 55/005* (2013.01); *B29C 55/04* (2013.01); *B32B 27/32* (2013.01); *B32B 27/36* (2013.01); *C08J 5/18* (2013.01); *B29K 2067/00* (2013.01); *B29K 2995/0053* (2013.01); *B29K 2995/0077* (2013.01); *B32B 2309/105* (2013.01); *B32B 2439/70* (2013.01); *C08J 2300/00* (2013.01); *C08J 2367/02* (2013.01)

(58) Field of Classification Search
CPC ....... B29C 55/12; B29C 55/14; B29C 55/143; B29C 55/146; B29C 55/16
See application file for complete search history.

(56) References Cited

U.S. PATENT DOCUMENTS

| 5,094,799 | A | 3/1992 | Takashige et al. | |
|---|---|---|---|---|
| 5,958,581 | A * | 9/1999 | Khanarian | ........... C08G 63/672 264/176.1 |
| 8,420,769 | B2 | 4/2013 | Eritate | |
| 9,527,954 | B2 * | 12/2016 | Sipos | ................... C08G 63/181 |
| 9,561,676 | B2 * | 2/2017 | Sakellarides | ............ B41J 31/04 |
| 9,567,431 | B2 * | 2/2017 | Sipos | ................... C08G 63/181 |
| 9,969,150 | B2 * | 5/2018 | Bhattacharjee | ........ B32B 27/306 |
| 2012/0288692 | A1 * | 11/2012 | Broyles | ...................... B32B 7/12 428/213 |
| 2013/0011631 | A1 * | 1/2013 | Sakellarides | ............ B32B 27/06 428/195.1 |
| 2013/0095269 | A1 * | 4/2013 | Carman, Jr. | ......... C08G 63/199 428/36.92 |
| 2014/0004286 | A1 | 1/2014 | Sakellarides et al. | |
| 2014/0065305 | A1 | 3/2014 | Lübbecke | |
| 2014/0065315 | A1 * | 3/2014 | Siu | .............................. C08J 5/18 427/444 |
| 2015/0141584 | A1 * | 5/2015 | Saywell | ............... C08G 63/181 525/444 |
| 2017/0306119 | A1 * | 10/2017 | Moffitt | .................. B29C 55/005 |

(Continued)

FOREIGN PATENT DOCUMENTS

| EP | 2486027 B1 | 6/2014 |
|---|---|---|
| WO | 2010/077133 A1 | 7/2010 |
| WO | 2011/043661 A1 | 4/2011 |

(Continued)

OTHER PUBLICATIONS

De Jonh E. et al.,: "Furandicarboxylic Acid (FDCA), A Versatile Building Block for a Very Interesting Class of Polyesters", Biobased Monomers, Polymers, and Materials; [ACS Symposium Series], American Chemical Society, Washington, DC, pp. 1-13, Aug. 16, 2012.
Gandini et al., "Rapid Communication, The Furan Counterpart of Poly(ethylene terephthalate): An Alternative Material Based on Renewable Resources", Journal of Polymer Science: Part A: Polymer Chemistry, pp. 295-298, vol. 47 (2009), Portugal.
Australian Government, IP Australia, Application No. 2015307312, Examination Report No. 1, Feb. 6, 2020, pp. 1-3.

(Continued)

*Primary Examiner* — Atul P. Khare
(74) *Attorney, Agent, or Firm* — Hoffmann & Baron, LLP

(57) ABSTRACT

An oriented film including poly(ethylene-2,5-furandicarboxylate) is produced in a process by preparing a sheet from a poly(ethylene-2,5-furandicarboxylate) resin by heat processing, which sheet has a thickness of at most 2.5 mm; allowing the sheet to cool; and stretching the cooled sheet in at least one direction with a stretch ratio of at least 4/1 at a temperature in the range of 90 to 130° C., yielding an oriented film. The oriented film has a thickness of 1 to 400 μm and a tensile strength at break of at least 100 MPa.

24 Claims, No Drawings

(56) References Cited

U.S. PATENT DOCUMENTS

2018/0244878 A1* 8/2018 Inagaki .................. C08J 5/18
2019/0106534 A1* 4/2019 Inagaki .................. C08J 5/18

FOREIGN PATENT DOCUMENTS

| WO | 2013/062408 A1 | 5/2013 | |
|----|----|----|----|
| WO | 2013/097013 A1 | 7/2013 | |
| WO | WO-2013097013 A1 * | 7/2013 | ........... C08G 63/181 |
| WO | 2013/149221 A1 | 10/2013 | |
| WO | 2014/100265 A1 | 6/2014 | |

OTHER PUBLICATIONS

National Intellectual Property Administration, PRC, Application No. 201580045733.X, The Notification of the Second Office Action, dated Dec. 11, 2019, 19 pages.

Japanese Patent Office, Application No. 2017-531441, Decision of Rejection, dated Feb. 10, 2020, 8 pages.

* cited by examiner

PROCESS FOR PRODUCING AN ORIENTED FILM COMPRISING POLY(ETHYLENE-2,5-FURANDICARBOXYLATE)

CROSS-REFERENCE TO RELATED APPLICATIONS

This application is the National Stage of International Application No. PCT/NL2015/050593 filed Aug. 25, 2015, which claims the benefit of Netherlands Application No. NL 2013360, filed Aug. 25, 2014, and U.S. Provisional Application No. 62/041,309, filed Aug. 25, 2014, the contents of all of which are incorporated by reference herein.

FIELD OF THE INVENTION

The present invention relates to a process for producing oriented film comprising poly(ethylene-2,5-furandicarboxylate) and to an oriented film comprising poly(ethylene-2,5-furandicarboxylate).

BACKGROUND OF THE INVENTION

Polyesters have been used as starting material for the production of films for a long time. A prime example of such a polyester is poly(ethylene terephthalate) (PET). The latter polyester is manufactured from ethylene glycol and terephthalic acid or an ester thereof. Terephthalic acid is typically synthesized by the oxidation of p-xylene, which is obtained from fossil fuels. In view of the environmental impact of the winning of fossil fuels and the increased scarcity thereof there is a growing desire to replace fossil fuel-related starting materials by sustainable sources.

An interesting replacement for terephthalic acid is constituted by 2,5-furandicarboxylic acid. This acid can be manufactured from carbohydrates. In EP2486027 and EP2486028 it is described how biomass can be converted to 5-hydroxymethyl furfural or its derivatives, and how these compounds can be subsequently oxidized to yield 2,5-furandicarboxylic acid. This acid or an ester thereof may be used in the preparation of a polyester via polycondensation with an alkylene diol, such as ethylene glycol. The preparation of such a polyester has been described in WO 2010/077133. In the latter patent application it has been mentioned that the polyester prepared is suitable for use in bottle, film and fiber applications.

The suitability of such a polyester in the preparation of bottles, films and fibers is reiterated in WO 2013/062408. According to this application the polyesters with a number average molecular weight of at least 25,000 (as determined by GPC based on polystyrene standards) are very suitable for the preparation of packaging material because the material has excellent barrier properties for oxygen, carbon dioxide and water. These barrier properties are such that the polyester was held excellently suitable for the manufacture of a carbonated soft drinks container. The application describes the preparation of a bottle by injection blow molding of a preform. It is stated that in the blow molding process the stretch ratios for a preform made from poly (ethylene-2,5-furandicarboxylate) are higher than for conventional PET bottles. The optimum axial stretch ratio may be in the range of 2.0 to 4.0 and the optimum radial ratios may be in the range of 5.0 to 7.0. In an example it is shown that the oxygen barrier properties of such a bottle are five-fold better than those for a PET bottle, and for $CO_2$ the barrier properties were two times better.

It is well known that a bottle preform looks like a test tube, usually with a screw-thread at the top. As is taught by V. B. Gupta et al., in "Handbook of Thermoplastic Homopolymers, Copolymers, Blends and Composites", edited by S. Fakirov, Wiley, 2002, pages 369-373, a preform has a thicker side wall and a thinner shoulder underneath the screw thread. The side wall usually has a thickness of greater than 3 mm. WO 2013/062408 teaches that when such a preform made from poly(ethylene-2,5-furandicarboxylate) is used for blow molding a bottle, the $CO_2$ and $O_2$ barrier properties of the resulting bottle are two to five times better than for a PET bottle that has been made from a similar preform that consists of PET.

In WO 2013/149221 films prepared from poly(trimethylene-2,5-furandicarboxylate) are described. Such films are stated to have better barrier properties than PET films. In a comparative example a film of poly(ethylene-2,5-furandicarboxylate) is prepared by compression molding. The resulting film was 8-10 μm thick. The film showed opaqueness, indicating substantial crystallinity. The barrier properties of the film was stated to be inferior to films made from poly(trimethylene-2,5-furandicarboxylate). WO 2013/149221 further shows that when poly(trimethylene-2,5-furandicarboxylate) preforms are blow molded into bottles, the barrier properties are better than those of PET bottles made from similar preforms, but that the mechanical properties were unsatisfactory, as shown by e.g. the elongation at break, which was about 4 to 7%.

SUMMARY OF THE INVENTION

It has now surprisingly been found that when a sheet from a poly(ethylene-2,5-furandicarboxylate) resin with a thickness of at most 2.5 mm is stretched with a stretch ratio of at least 4, the resulting film not only has excellent mechanical properties, but also improved barrier properties in comparison with the shown barrier properties of the bottle according to WO 2013/062408.

Accordingly, the present invention provides a process for producing an oriented film comprising poly(ethylene-2,5-furandicarboxylate), which process comprises:

preparing a sheet from a poly(ethylene-2,5-furandicarboxylate) resin by heat processing, which sheet has a thickness of at most 2.5 mm;

allowing the sheet to cool; and stretching the cooled sheet in at least one direction with a stretch ratio of at least 4/1 at a temperature in the range of 90 to 130° C., yielding an oriented film.

DETAILED DESCRIPTION OF THE INVENTION

The sheet that is used in the process of the present invention is prepared from a poly(ethylene-2,5-furandicarboxylate) resin. Advantageously, the poly(ethylene-2,5-furandicarboxylate) in the resin has a high molecular weight, because a relatively high molecular weight has a positive effect on the mechanical properties of the eventual film. However, the molecular weight of the poly(ethylene-2,5-furandicarboxylate) may vary between a wide range. Suitably, the weight average molecular weight of the poly (ethylene-2,5-furan-dicarboxylate) in the resin is at least 60,000 g/mol. Preferably, it is in the range of 60,000 to 500,000 g/mol, preferably from 60,000 to 250,000 g/mol. The weight average molecular weight and also the number average molecular weight of the poly(ethylene-2,5-furandicarboxylate) can be determined through the use of GPC.

GPC measurements are suitably performed at 25° C. For the calculation polystyrene standards are used. As eluent, suitably a solvent mixture of chloroform:2-chlorophenol 6:4 (vol/vol), can be used. In the experimental part GPC measurements of the poly(ethylene-2,5-furandicarboxylate) were carried out under these conditions on a Merck-Hitachi LaChrom HPLC system equipped with two PLgel 5 μm MIXED-C (300×7.5 mm) columns. Calculation of the molecular weight was carried out by Cirrus™ PL DataStream software.

The weight average molecular weight of the poly(ethylene-2,5-furandicarboxylate) can also be expressed in terms of the intrinsic viscosity (IV). First the relative viscosity ($\eta_{rel}$) is determined in a 60/40 w/w mixture of phenol and tetrachloroethane at 30° C. and a poly(ethylene-2,5-furandicarboxylate) concentration (c) of 0.4 g/dL. This procedure is similar to the ASTM D4603 standard for the determination of the inherent viscosity for poly(ethylene terephthalate). The intrinsic viscosity is then calculated using the Billmyer equation:

Intrinsic viscosity (IV)=$\{\eta_{rel}-1+3*\ln(\eta_{rel})\}/(4*c)$.

The present inventors have found that an empirical correlation between the weight average molecular weight and intrinsic viscosity can be described as IV=$1.23*10^{-4}*M_w^{0.7792}$.

It has been found that the polymers with a relatively high molecular weight result in films showing a higher tensile strength than the polymers having a lower molecular weight. Therefore, the weight average molecular weight of the poly(ethylene-2,5-furandicarboxylate) in the resin is preferably at least 75,000 g/mol, e.g. in the range of 75,000 to 200,000 g/mol. In terms of intrinsic viscosity, the molecular weight of the poly(ethylene-2,5-furandicarboxylate) is preferably at least 0.77 dL/g, e.g. in the range of 0.77 to 1.66 dL/g. It is known to determine the number average molecular weight (Mn) also with GPC using polystyrene standards. The quotient Mw/Mn, which is known as the dispersity or polydispersion index (PDI), is suitably in the range of 1.6 to 2.5, preferably from 1.9 to 2.2.

The poly(ethylene-2,5-furandicarboxylate) resin suitably has a relatively high melting point. The melting point of the poly(ethylene-2,5-furandicarboxylate) is typically influenced by the presence of comonomers other than ethylene glycol and 2,5-furandicarboxyli acid, that deliberately or inadvertently are included in the poly(ethylene-2,5-furandicarboxylate) or by the crystallinity of the poly(ethylene-2,5-furandicarboxylate). Suitable melting points include at least 215° C. The melting point of the polyester may be as high as 245° C. The melting point of a polymer is easily determined by Differential Scanning calorimetry (DSC) and measured at the top of the endothermic peak. The ISO11357-3 standard describes such a melting determination. In accordance with this determination, the polyester composition according to the present invention suitably has a melting point of at least 215° C. In this context it is observed that US 2014/0065315 mentions polyolefin films that may be coated with a polyester. However, such a polyester should have a melting point below 210° C.

The poly(ethylene-2,5-furandicarboxylate) resin is suitably prepared in a way as described in WO 2013/062408. This process includes a step wherein bis(2-hydroxyethyl)-2,5-furan-dicarboxylate is provided, e.g. by the esterification of 2,5-furandicarboxylic acid with ethylene glycol or the transesterification of dialkyl-2,5-furandicarboxylate with ethylene glycol. The product obtained is subjected to a polycondensation step at reduced pressure and under melt conditions to obtain a poly(ethylene-2,5-furandicarboxylate) condensate. The condensate tends to be amorphous. According to the process of WO 2013/062408 the condensate is then treated in a drying/crystallization step. This step includes maintaining the condensate at a temperature in the range of 90 to 200° C. Thereto, the condensate is subjected to a heating step, whilst still in a solid state, at the temperature indicated. In certain arrangements the heating step may entail controlling the temperature of the condensate during pelletization such that the temperature of the final pellets is in a range where crystallization occurs. Pellets may be produced from the molten condensate by underwater pelletization. This process is known for the production of e.g. PET pellets. Prior to any step of additional heating any adhered water from the pelletizing step is removed from the pellets. Thereafter, this procedure is suitably carried out by bringing the temperature of the poly(ethylene-2,5-furandicarboxylate) polycondensate to the desired temperature in the range of 90 to 200° C. For poly(ethylene 2,5-furandicarboxylate) it has been found that the most rapid crystallization occurs at approximately 150 to 170° C. It has also been found that if the particles are held for approximately 1 hour at 90 to 120° C. the subsequent crystallization at 150 to 170° C. is faster. The heating step can suitably be conducted at atmospheric pressure or under vacuum. The heat can suitably be provided by a water bath. The optimal temperature program will depend on the particular arrangements used for the crystallization. Typically, the condensate is kept a temperature in the range of 90 to 140° C. for a period of 0.2 to 2.5 hrs, followed by a crystallization step for 1 to 48 hours at a temperature in the range of 120 to 200° C. It has been found that the polyester chains in the condensate crystallize under these conditions yielding a semi-crystalline polyester composition.

The dried and crystallized poly(ethylene-2,5-furandicarboxylate) condensate is then subjected to post condensation conditions, also known as solid state polymerization to obtain the desired polymer resin. The resin is suitably dry, such that is has a water content of at most 50 ppm. It also tends to be semi-crystalline due to the drying/crystallization step. When the poly(ethylene-2,5-furandicarboxylate) polymer resin is semi-crystalline its mechanical properties are improved over amorphous polymer.

The poly(ethylene-2,5-furandicarboxylate) sheet is prepared by heat processing. In heat processing the polymer resin is heated to a temperature above its glass transition temperature (Tg), more generally above its melting point. The glass transition temperature of poly(ethylene-2,5-furandicarboxylate) is typically at most 90° C. Commonly, poly(ethylene-2,5-furandicarboxylate) has a Tg of about 85° C. The Tg is influenced by the presence of comonomers other than ethylene glycol and 2,5-furandicarboxyli acid, that deliberately or inadvertently are included in the poly(ethylene-2,5-furandicarboxylate). The heat processing may be carried out as compression molding. Although compression molding is typically used for thermosetting resins, it is possible to use this method for the thermoplastic poly(ethylene-2,5-furandicarboxylate), too. In this method the poly(ethylene-2,5-furandicarboxylate) resin is preheated and positioned in a mold. The mold is closed so that the resin is between two plates. The dimensions of the mold are such that the thickness of the resulting sheet is at most 2.5 mm. Heat and pressure are applied to the mold to form the sheet with the desired thickness. When the heat processing is carried out as compression molding the temperature is preferably in the range of 245 to 265° C., and the pressure is suitably greater than 10 bar, e.g. from 12 to 25 bar.

Preferably, the heat processing is carried out as extrusion. In this extrusion method chips or pellets of poly(ethylene-2,5-furandicarboxylate) resin are heated above its melting point. The molten polymer is subsequently pushed through a die to form a sheet of the desired thickness and subsequently cooled to a temperature below the melting point of the polymer so that the polymer solidifies. A usual manner to push the molten polymer through the die is via an extrusion screw or a melt pump. The extruder may be a twin screw extruder, but is preferably a single screw extruder. The length to diameter of the extruder is preferably in the range of 15:1 to 40:1. The extruder may be provided with a vent section to promote the removal of volatile components, if present. The temperature at which the extrusion is carried out is suitably in the range of 230 to 280° C. The extrusion may use a die in the form of a slit so that a continuous sheet is produced. The die may be flat or annular. In an annular die the melt flows through the annular opening and forms a tubular film. The dimensions of the die are such that after leaving the die the resulting sheet has a thickness of at most 2.5 mm.

When a multilayer structure is desired, the extrusion process is preferably a coextrusion process. This is particularly suitable when several layers of different or the same polymers are combined. In such a case one or more extruders for each of the polymers to be included in the structure can be used and the flows of these polymers are combined into the desired multilayer structure. Alternatively, multiple dies might be used and the molten films combined immediately after the extrusion step and prior to the step of orienting the film.

The heat processing results in a sheet with a thickness of at most 2.5 mm. This sheet comprises amorphous or semi-crystalline poly(ethylene-2,5-furandicarboxylate) and tends to be brittle at ambient temperature. Its mechanical properties are such that it has a tensile strength of less than 95 MPa, and its elongation at break is typically below 15%. To improve the mechanical properties, the sheet is stretched. For optimum stretch ratios and most desired thicknesses of the eventual films, the sheet thickness is preferably at least 0.05 mm, more preferably in the range of 0.1 to 2.0 mm, and most preferably in the range of 0.15 to 1.8 mm.

The poly(ethylene-2,5-furandicarboxylate) sheet can be of a wide range of formats. In an extrusion method the sheet can be of indefinite length. The width of such a sheet can be selected within wide ranges. Typically, the width is at least 50 times the thickness of the sheet. When the sheet is heat processed by means of compression molding the length is finite. Suitably both the length and the width in this case are at least 50 times the thickness of the sheet.

The poly(ethylene-2,5-furandicarboxylate) sheet is cooled to a temperature below its melting point so that it solidifies. The cooling can e.g. be accomplished by quenching the heat processed sheet over a chill roller. This is a roller that is maintained at a controlled, relatively low temperature. The cooling can be done to a temperature in a wide range. The molten sheet is maintained in direct contact with the chill roller in order to remove heat from the molten sheet and cool it to the desired temperature. It has been found that a chill roller temperature of above 80° C. is undesirable for film formation, due to excessive sticking and the formation of deposits on the roller. The most preferred temperature range for the chill roller is 45-75° C., although lower temperatures can be used if needed for especially thick films. An alternative to the chill roller is to pass the molten sheet into a temperature controlled bath, such as a water bath, and passing it between a pair of rollers to pull and stabilize the sheet as it enters the water bath. By quenching the molten sheet the occurrence of crystallinity in the sheet is avoided. The sheet obtained in the present invention suitably has a crystallinity of at most as measured with DSC.

When an annular die is used, the molten poly(ethylene-2,5-furandicarboxylate) sheet, in the form of a tube, is maintained in an inflated condition through the use of air pressure inside of the tube. In a blown film apparatus a flow of cooling air is provided to the interior of the molten tube. Usually, air is also provided on the outside of the tube. The internal and external air serve to cool the tube. The thus hardened tube is pulled upwards, commonly by a set of rollers. These rollers are pressed together to keep a more or less constant air volume in the tube. The rollers also serve to guide the tube to packaging, cutting or other processing equipment. Since the blown film process is relatively simple, the stretching of the cooled sheet according to the present invention is suitably conducted in a blown film apparatus.

As stated above a molten poly(ethylene-2,5-furandicarboxylate) tube may be cooled by air inside and outside of the tube. It may also be cooled by collapsing and passing the tubular sheet through a quench bath, e.g. a water bath at a temperature of 10 to 50° C. The tube may further be subjected to a process similar to the so-called double bubble process, which is known for nylon-6 from U.S. Pat. No. 5,094,799. In such a process the tube is re-inflated by injecting an amount of air into the interior of the tube once the tube is at the desired temperature. According to the method described in U.S. Pat. No. 5,094,799 an air ring may concurrently blow air to the draw start point of the tube to expand the tube in the form of a bubble. The tube may further downstream be split to form two films, which may be of equal width. It is observed that by the initial injection of air already stretching occurs so that the tube already results in biaxially oriented films.

Hence, it is feasible to cool the poly(ethylene-2,5-furandicarboxylate) sheet to ambient temperature. However, since it is desired to subject the sheet to stretching at elevated temperature, the sheet is suitably not cooled to a temperature that is undesirably low. Suitably, the sheet is allowed to cool to a temperature of at most 130° C., preferably in the range of 25 to 130° C., more preferably in the range of 70 to 125° C., most preferably in the range of 90 to 125° C. In this way the sheet can be stretched without the need to re-heat the sheet to the stretching temperature.

As indicated above, the mechanical properties and barrier properties of the poly(ethylene-2,5-furandicarboxylate) sheet are improved by stretching it. The stretch ratio is at least 4/1. The stretching can be accomplished drawing the sheet in one direction, yielding uniaxially oriented films. The cooled sheet is suitably stretched by accelerating the sheet along one or more sets of rollers which are operated at a higher speed than the speed of the so-called feed rollers, with which the sheet is fed into the rollers. When this is done, the stretching in the one direction is at least done with a draw ratio (stretch ratio) of at least 4. When a uniaxially oriented film is desired the stretch ratio is preferably in the range of 4 to 8. The mechanical properties of oriented films are further improved if the sheet is stretched in at least two directions. The number of directions is not critical. It is possible to stretch the sheet in up to four directions. However, it is most practical to stretch the sheet in two directions. In this way a biaxially oriented film is obtained. The skilled person will understand that in order to arrive at a stretch ratio of at least 4, it is possible to stretch the sheet with a stretch ratio of 2 in one direction and with a stretch ratio of 2 in a second direction. Since thin films are generally desired, and because improved results are attainable when the total stretch ratio is greater than 4, the cooled sheet is preferably stretched in one direction with a stretch ratio of at least 3.0 and in a second direction in a stretch ratio of at least 3.0. This results in a total stretch ratio of at least 9. Since even higher stretch ratios improve the barrier properties, the cooled sheet is more preferably is stretched in one direction with a stretch ratio above 4.0 and in a second direction in a stretch ratio of above 4.0.

Whereas the stretching of the cooled sheet in a first direction can suitably be arranged via one or more sets of rollers, the stretching of a uniaxially oriented film in a second direction can be accomplished by using a so-called tenter frame. Such a frame suitably consists of two divergent endless belts fitted with clips. The partially stretched sheet is gripped by these clips so that it is stretched as it travels along the endless belts. These endless belts pass through a temperature controlled space in order to maintain the sheet at the desired temperature during the stretching process. By stretching the sheet is turned into an oriented film.

It is observed that the stretch ratios for the cooled poly(ethylene-2,5-furandicarboxylate) sheet according to the present invention are different from the stretch ratios for the poly(ethylene-2,5-furandicarboxylate) bottle according to WO 2013/062408. For a bottle the optimum stretch ratios may range from 2.0 to 4.0 in an axial direction and from 5 to 7.0 in a radial direction. First, the starting wall thickness is beyond 3 mm in the bottle preform whereas the maximum sheet thickness is 2.5 mm. Whereas the length and width of the preform do not exceed 40 times the wall thickness, the length and width of the sheet are typically at least 50 times the thickness of the sheet. More importantly, the optimum stretch ratios are also different. For sheets the optimum stretch ratios are above 4.0 in one direction and above 4.0 in a second direction. The stretch ratios may preferably be from 4.2 to 5.5 in one direction and from 4.2 to 8.0 in a second direction.

The stretching of a poly(ethylene-2,5-furandicarboxylate) sheet is suitably done in two directions, to yield a biaxially oriented film. The directions may be perpendicular.

Although the stretching can be done simultaneously, it is more practical to carry out the stretching sequentially. A suitable manner to achieve the stretching can be done by drawing the cooled sheet in the direction of the extrusion, the so-called machine-direction (MD), followed by drawing the uniaxially drawn sheet in the transverse direction (TD), so that a biaxially oriented film is obtained. Further it is possible to effect the stretching in more than one stage. The number of stages may vary from 1 to 6, suitably 1 to 2.

If the stretching in both directions is done simultaneously, a blow film process may be more practical.

The cooled poly(ethylene-2,5-furandicarboxylate) sheet is stretched at a temperature of 90 to 130° C. That means that if the heat-processed sheet has been allowed to cool to a temperature of below 90° C., or if the cooled sheet has a temperature below the desired stretching temperature with the latter range, the cooled sheet is to be re-heated. The skilled person will realize that re-heating can be done in a variety of ways. Hence it is possible to pass the sheet along one or more heated rollers that is or are maintained at the desired temperature so that the sheet reaches the desired temperature within the range of 90 to 130° C. Alternatively, the poly(ethylene-2,5-furandicarboxylate) sheet may be passed through a temperature-controlled environment, such as an oven. A further alternative is provided by infra-red heaters. Preferably, the stretching is done at a temperature in the range of 92 to 128° C., more preferably from 95 to 110° C. When the stretching is done simultaneously in two or more directions, the temperature of the stretching step will be the same for stretching in each of the directions. However, it is not necessary that each stretching step takes place at the same temperature. When the stretching in two or more directions takes place sequentially, the temperature of the stretching in each direction can be the same as or different from the stretching in other directions. As indicated above, both for stretching in one direction and for stretching in more than one direction, each stretching step may be carried out in more than one stage. Also for such stages, the temperatures may be different. Evidently, the temperature for the stretching in each direction and for each stage should be in the range of 90 to 130° C. Suitably, the temperature at stretching in the transverse direction is higher than the temperature at stretching in the machine-direction. Such temperature difference may be from 3 to 20° C., preferably from 5 to 15° C.

The oriented poly(ethylene-2,5-furandicarboxylate) film that is obtained in the process according to the invention has excellent mechanical and barrier properties. These properties may be even further improved by subjecting the film to a heat-setting step. This step is effected by maintaining the film at elevated temperature, viz. above the temperature used for stretching, for a short period of time, e.g., less than one minute, such as from 10 to 60 seconds, under restraint. Therefore, the oriented film after stretching of the cooled sheet is suitably heated to a temperature of 140 to 210° C., preferably 150 to 200° C., while maintaining the oriented film under restraint. The additional heating will cause the oriented film to start shrinking. Due to the restraint imposed upon it, a tension force will be generated. If the heat setting step is done as part of an extension to a tenter-frame stretching apparatus, the expanding section of endless belts may be augmented by a section, wherein the belts are of a continuous width or even contracting slightly in width, typically up to a few percent, e.g. at most 5 percent, of the original width. Heat setting can be done by means of steam or under dry conditions. Because the poly(ethylene-2,5-furandicarboxylate) might degrade in the presence of water, it is preferred to conduct the heat-setting step under dry conditions. The film after heat setting shows an improved shrinkage behavior in that it tends to shrink less than films that have not been subjected to heat setting.

When a poly(ethylene-2,5-furandicarboxylate) tubular sheet is created by means of an annular die a heat-setting step may suitable be conducted by first subjecting the sheet to a biaxial stretching step by inflating the tubular sheet with air to yield the stretched film. The thus stretched film may then be allowed to collapse, be re-heated to the temperature of the heat-setting step, be re-inflated and optionally slit and wound. The interior pressure in the tube for the heat-setting step is typically higher than the pressure in the initial biaxial stretching step.

It is evident to the skilled person, that when a film with a high shrinkage behavior is desired, the heat-setting step may not be included in the production process of the oriented film.

The resin comprises poly(ethylene-2,5-furandicarboxylate) polymer. The polymer contains ethylene moieties and 2,5-furandicarboxylate moieties. Evidently, the polymer may also contain other diol or diacid residues. The residues of other diols include those of 1,2-propane diol, 1,3-propane diol, 1,4-butane diol, 1,6-hexane diol, 1,4-bis(hydroxymethyl) cyclohexane, 2,2,4,4-tetramethylcyclobutane-1,3-diol and isosorbide. Other diols include the oligomers of ethylene glycol, such as diethylene glycol and triethylene glycol. Other diacids that may be used in the preparation of the polymer resin used in the present invention include adipic acid, succinic acid, maleic acid, terephthalic acid, isophthalic acid, phthalic acid and the isomers of cyclohexane dicarboxylic acid and tetrahydrofuran dicarboxylic acid. The amount of other diol or diacid residues is suitably at most 10 mol %, based on the molar amount of 2,5-furandicarboxylate moieties.

U.S. Pat. No. 8,420,769 shows a process, wherein a polymer is prepared from 2,5-furandicarboxylic acid and a mixture of diethylene glycol and ethylene glycol. In a comparative experiment this document shows that even when no diethylene glycol is added to the starting material, the resulting polymer contain about 5 mol % of diethylene glycol moieties, based on the molar amount of 2,5-furandicarboxylate moieties. It is desired to have a lower amount of diethylene glycol moieties in the polymer. It is believed that diethylene glycol is formed by the reaction between two monoethylene glycol compounds under the reaction conditions that exist when the polymer is formed. It has been found that low levels of diethylene glycol content can be achieved by conducting the step wherein bis(2-hydroxyethyl)-2,5-furan-dicarboxylate is provided, e.g. by the esterification of 2,5-furandicarboxylic acid with ethylene glycol or the transesterification of dialkyl-2,5-furandicarboxylate with ethylene glycol, in the presence of a basic compound and/or ammonium compound capable of suppressing the formation of diethylene glycol. Suitable basic and ammonium compounds are selected from the group consisting of tetraalkyl ammonium compounds, choline, alkali metal salts of carboxylic acids, alkaline earth metal salts of carboxylic acids, basic alkali metal salts of mineral acids, basic alkaline earth metal salts of mineral acids, alkali metal hydroxides, ammonium hydroxides and combinations thereof. Very suitable compounds are tetraalkyl ammonium hydroxide compounds, preferably selected from tetramethyl ammonium hydroxide, tetraethyl ammonium hydroxide and combinations thereof, $NaH_2PO_4$ and $Na_2HPO_4$. The use of such compounds allows the provision of poly(ethylene-2,5-furandicarboxylate) with a low content of diethylene glycol groups. Therefore, the poly(ethylene-2,5-furandicarboxylate) resin used in the present invention suitably contains at most 4.5% mol of diethylene glycol moieties, based on the molar amount of 2,5-furandicarboxylate moieties. Preferably, the amount of diethylene glycol moieties is at most 3.2 mol %, based on the molar amount of 2,5-furandicarboxylate moieties. The level of diethylene glycol moieties is desirably as low as possible, preferably zero. Therefore, the amount of diethylene glycol moieties is most preferably from 0 to 3.2 mol %, in particular from 0.1 to 3.0 mol %, based on the molar amount of 2,5-furandicarboxylate moieties.

The poly(ethylene-2,5-furandicarboxylate) resin may also comprise one or more other polymers and additives. Suitable other polymers include poly(ethylene terephthalate), polyamides, such as nylon-6, nylon 6,6, and polyaramides, polyolefins, such as polyethylene and/or polypropylene, block copolymers of styrene and butadiene and/or isoprene, ethylene vinyl alcohol polymers, polyacrylates, polymethacrylates and/or, optionally, others. It is preferred that the resin does not contain more than 50% wt of the other polymer or polymers, based on the weight of the resin. Preferably, the resin does not contain more than 20% wt of the other polymer or polymers, based on the weight of the resin. More preferably, the resin does not contain any other polymer.

The skilled person will understand that the film may comprise one or more additives. Such additives may include some of the basic compounds and/or ammonium compounds capable of suppressing the formation of diethylene glycol. The film may also contain other compounds or additives, such as plasticizers, softeners, dyes, antioxidants, oxygen scavengers, UV-stabilizers, fillers and other additives. Slip agents may be added to the surface of the film to modify the friction coefficient. The film may also include agents to form a cavitated film upon orientation.

The poly(ethylene-2,5-furandicarboxylate) film may be a component of a multilayer structure. Such a multilayer structure comprises a film according to the invention and one or more additional layers. The multilayer structure may include layers which are included for the purpose of being a structural carrier and the film according to the invention may be included to enhance the barrier properties of the multilayer structure to gases or aromas. The multilayer structure may also include layers specifically to promote the adhesion of the various other layers This can for instance be done to increase the adhesion between poly(ethylene-2,5-furandicarboxylate) and a polyolefin or between poly(ethylene-2,5-furandicarboxylate) and another polyester, or between any other layer combinations as might be desired. The multilayer structure might also include one or more additional layers at the surface specifically to enhance or modify the sealing characteristics of the multilayer structure. For example, a heat seal layer or pressure adhesive seal layer might be included. The multilayer structure might also include a layer formed by deposition of a metal onto a polymer substrate, to form a so-called metalized film. The metal layer may serve as a decorative layer or to further enhance the barrier properties of the multilayer structure. The multilayer structure may further include a layer which is printed with text or graphic designs, either on a surface layer or contained within the multilayer structure. If desired a surface treatment such as known in the art may be used to modify the surface energy of the structure, for example to increase printability. The multilayer structure can include any number of desired layers. Advantageously, the one or more additional layers comprise a polyolefin.

The multilayer structure can be formed by a variety of means. One approach is to coextrude the desired layers into a multilayer molten film, such as in a blown film or extrusion cast film, prior to the step of orienting the film. In such a case it is typical to use one or more extruders for each of the polymer resins to be included in the structure and to combine the flows into the desired multilayer structure in a suitable feedblock and die combination. Alternatively, multiple dies might be used and the molten films combined immediately after the extrusion step and prior to the step of orienting the film. Another approach is to form a film and orient the film, and then subsequently laminate the film to an additional film layer or layers to create a multilayer structure. For example, an oriented film, which may itself be multilayer, may be oriented to a substrate such as paper to create a multilayer structure.

Due to the present process the skilled person has for the first time at his disposal a film comprising poly(ethylene-2,5-furandicarboxylate) with a tensile strength before breaking of at least 100 MPa. These films are not only novel but they also provide better barrier properties than corresponding PET films or bottles made from poly(ethylene-2,5-furandicarboxylate). Accordingly, the present invention also provides oriented film comprising poly(ethylene-2,5-furandicarboxylate), having a thickness of 1 to 400 μm and a tensile strength at break of at least 100 MPa, determined according to ISO527. The film suitably has a tensile strength before breaking of at least 100 MPa, preferably at least 125 MPa determined according to ISO 537. Typically, the tensile strength will be at most 500 MPa. Preferably, the tensile strength before breaking is in the range of 125 to 350 MPa.

The oriented film according to the invention has not only an excellent tensile strength. It also has an excellent tensile modulus. The skilled person now has an oriented film comprising poly(ethylene-2,5-furandicarboxylate) at his disposal with a tensile modulus of at least 2,000 MPa. The film suitably has a tensile modulus in the range of 2,000 to 12,500 MPa, preferably from 3,000 to 10,000 MPa.

Another mechanical property that is being improved by the process according to the present invention is the improved flexibility, as shown by its longer elongation before break. Whereas the poly(ethylene-2,5-furandicarboxylate) sheet before stretching tends to be brittle and does not have any significant flexibility, the oriented film according to the present invention has great flexibility. The oriented film according to the present invention may have an elongation at break of at least 25%, determined according to ISO 527. The maximum elongation may be as high as 250%. Suitably, the elongation at break for the oriented film may be controlled through the conditions used for processing the film. Typically, the oriented film has an elongation at break in the range of 40 to 150%.

The poly(ethylene-2,5-furandicarboxylate) films can also be prepared to have a desired value for shrinkage when exposed to hot conditions. For example, at a low degree of stretching the shrinkage is typically quite high, but is lower at higher extents of stretching. If desired, the shrinkage can be reduced to very low values either by high degree of stretching or by including a step of heat setting the film, as previously described herein. Hence, the present invention provides such films which have a shrinkage of at most 5%, preferably at most 3%, determined at 90° C. in glycerol for 20 seconds, in accordance with ASTM D2732-8.

A further property that is greatly enhanced is the impermeability to liquids and gases. The oriented poly(ethylene-2,5-furandicarboxylate) film is impermeable for liquid water. Moreover, it has great barrier properties for oxygen, so that deterioration of any packaged material due to oxidation can be avoided. Moreover, the barrier property to carbon dioxide is also excellent. The excellent barrier properties mean that the film can be used for packaging purposes for e.g. foods that benefit from packaging in a high $CO_2$ level atmosphere, a low or high oxygen level atmosphere or other modified atmospheres, Such foods include fresh meat, poultry, fish, cheeses and fruits, such as strawberries. The diffusion of $CO_2$ through the film is significantly reduced, compared to other packaging films. The oriented film according to the present invention suitably has an oxygen permeability of at most 0.7 cc-mm/m$^2$*day*atm, determined according to ASTM D-3985 at a temperature of 23° C. and a relative humidity of the oxygen of 0%. Preferably, the oxygen permeability is in the range at most 0.5 cc-mm/m$^2$*day*atm. It has a $CO_2$ permeability of at most 3.0 cc-mm/m$^2$*day*atm, at a temperature of 32° C. and a relative humidity of the $CO_2$ of 0%. The oxygen permeability is significantly improved in the film according to the present invention. Literature data show that the oxygen permeability for non-oriented poly(ethylene-2,5-furandicarboxylate) films is about 0.0107 barrer, which is 0.74 cc-mm/m2*day*atm (cf. Burgess, S. K.; Leisen, J. E.; Kraftschik, B. E.; Murbarak, C. R.; Kriegel, R. M.; and Koros, W. J.; "Chain Mobility, Thermal and Mechanical Properties of Poly(ethylene furanoate) Compared to Poly(ethylene terephthalate)", Macromolecules, 47, pp1383-1391, 2014). The oxygen permeability is suitably measured on a device such as a Ox-Tran 2/21 and the $CO_2$ permeability is suitably measured on a device such as a Permatran-C 4/41, both of which are manufactured by Mocon, Inc.

The inventors further believe that the optical characteristics of oriented poly(ethylene-2,5-furandicarboxylate) films according to the invention may also be of great utility. The poly(ethylene-2,5-furandicarboxylate) is a material which is slow to crystallize from the melt, and so making an optically low haze material via extrusion cast film is readily conducted, even for thicker sheet or film. The material retains its clarity as the sheets are stretched at the proper temperatures as specified in this application. Further, the refractive index of poly(ethylene-2,5-furandicarboxylate) is significantly different and lower than PET, which may give improved design options for films where it is desired to have a lower refractive index material which still has high moisture resistance, barrier resistance, and good thermal properties.

It has been found that the molecular weight of the poly(ethylene-2,5-furandicarboxylate) may become lower when the resin is subjected to the process according to the present invention. Thanks to the drying and crystallization step that has been discussed above, the amount of water in the resin is rather low. Therefore the degradation of the polymer during heat processing and, optionally, heat setting is limited. Accordingly, the film preferably comprises poly(ethylene-2,5-furandicarboxylate) that has a weight average molecular weight of at least 50,000 g/mol, preferably in the range from 55,000 to 100,000 g/mol.

The film may be uniaxially oriented. In the case of an extruded film, this might be the film after stretching in the machine direction (MD). The oriented film then has a uniaxial orientation. For most applications a biaxially oriented film is desired. Therefore, the oriented film according to the present invention preferably is a biaxially oriented film.

As indicated above, the oriented film may comprise other polymers and/or additives, in addition to poly(ethylene-2,5-furandicarboxylate). Examples for such other polymers and additives have been stated above.

Thanks to the excellent barrier properties of the oriented poly(ethylene-2,5-furandicarboxylate) film according to the present invention this film is very suitably laminated onto another material to obtain a laminated object. By doing so, the other material is provided with the barrier properties of the oriented film. The oriented film may be the top layer or the lower layer in any such laminated object. When more than two layers are used in the object the oriented film of the present invention may also form an intermediate flayer. The other material can be selected from many types of material. Suitable materials include paper, metal, e.g. aluminum or steel, or wood. However, the oriented film of the invention can suitably be used in the preparation of laminates comprising other types of polymers. Such polymers include polyolefins, such as polyethylene and polypropylene, polymethacrylates and polyacrylates, polyamides and polylactic acid, ethylene-vinyl alcohol polymers, block copolymers of styrene and butadiene and/or isoprene, which block copolymers may optionally be hydrogenated, and the like.

The oriented poly(ethylene-2,5-furandicarboxylate) film of the present invention can be used for a variety of applications. The film can be used for the same applications as those for which PET is used. That includes in particular packaging for foodstuffs.

The invention will be further illustrated by means of the following examples.

Example 1

A poly(ethylene-2,5-furandicarboxylate) (PEE) resin was melt processed into a cast film using an extruder with a melt temperature of approximately 240° C. The cast films were several meters in length and approximately 90 mm wide and 910 μm thick. The films were cooled to room temperature and subsequently were reheated and stretched into biaxially oriented films using a Karo IV film stretcher at 125° C. One film ("Film 1") was drawn with a stretch ratio of 2×2, according to the invention. Another film ("Comp. 1") was stretched with a lower stretch ratio, viz. L8×1.8. The stretching was done simultaneously in the MD and TD directions, and to the same extent in each direction. The weight average molecular weight ("Mw") of the PEE in the resin and in the films was determined using GPC using polystyrene standards. Conditions and resulting properties of the films are shown in Table 1 below.

TABLE 1

| | Stretch Ratio | Tensile modulus, MPa | Tensile strength, MPa | Elongation to break, % | Mw resin, g/mol | Mw film, g/mol |
|---|---|---|---|---|---|---|
| Film 1 | 2 × 2 | 2190 | 100 | 230 | 90,400 | 59,200 |
| Comp. 1 | 1.8 × 1.8 | 1470 | 68 | 220 | 90,400 | 59,200 |

The results show that the tensile strength is greatly enhanced to a value of 100 MPa and the tensile modulus is improved to a value of more than 2000 MPa by stretching the film with a stretch ratio of at least 4.

Example 2

Three PEE resins and one PET resin were processed into compression molded sheets using a heated press. The resins were first ground to a fine particle size and then dried. The ground and dried particles had the molecular weights and the diethylene glycol (DEG) content, expressed as mol percent with respect to the furandicarboxylate units, reported in Table 2 below.

TABLE 2

| Resin | Mn (number average molecular weight), g/mol | Mw (weight average molecular weight), g/mol | PDI (polydispersity index) | DEG, mol % |
|---|---|---|---|---|
| PEF A | 32,000 | 77,000 | 2.41 | 3.16 |
| PEF B | 33,300 | 85,000 | 2.55 | 2.68 |
| PEF C | 35,500 | 89,100 | 2.51 | 2.82 |
| PET | 37,000 | 74,000 | 2.00 | — |

Resin powder was then loaded into a mold, making sure the mold was completely filled, and heated and pressed at a temperature of 257-262° C. for the PEE resins and of 285° C. for the PET resin. The material was melted, pressed to a pressure of 17.5 kg/cm$^2$, and cycled through a vacuum step to remove any bubbles. The pressure/vacuum cycle is repeated 2 more times. The vacuum is achieved by encasing the mold inside a Kapton bag, equipped with a port for drawing a vacuum. The total pressing time was about 10 minutes, after which the mold was removed and the resulting sheet was quickly cooled to avoid any crystallization. The initial sheets had a thickness of 1500 μm, a width of 90 mm and a length of 90 mm. The sheets were subsequently reheated and biaxially stretched at the temperature indicated in Table 3 to form biaxially oriented PEF films using a Karo IV film stretching device. A total stretch ratio of 12.25 was obtained by 3.5×3.5 two-directions stretching. A stretch ratio of 16.00 was obtained by a 4.0×4.0 two-directions stretching. A total stretch ratio of 20.25 was obtained by 4.5×4.5 two-directions stretching. A total stretch ratio of 25.00 was obtained by 5.0×5.0 two-directions stretching. Sample 9 was subjected to an additional step of heat setting at 200° C. for 10 seconds, while allowing 5% relaxation. Conditions and resulting properties are shown in Table 2 below. Tensile strength, tensile modulus and elongation at break were measured according to ISO 527. The gas permeability data were obtained using a MOCON brand analyzer with oxygen determined at 23° C. and the $CO_2$ determination at 32° C. For the determination of samples 1 to 7 the gases had a relative humidity of 0% and were at a pressure of 1 atmosphere. For sample 9 the relative humidity of the oxygen gas had 75% relative humidity.

TABLE 3

| Sample | Resin | Mn sheet, g/mol | Mw sheet, g/mol | Stretch ratio | Stretch temp., ° C. | Tensile modulus, MPa | Tensile strength, MPa | Elongation at break, % | permeability, cc * mm/m$^2$ * day * atm $O_2$ | permeability, cc * mm/m$^2$ * day * atm $CO_2$ |
|---|---|---|---|---|---|---|---|---|---|---|
| 1 | A | 24300 | 51300 | 12.25 | 95 | 3646 | 133 | 98 | 0.68 | 2.91 |
| 2 | C | 22400 | 46000 | 16.00 | 95 | 4549 | 159 | 86 | 0.38 | 2.43 |
| 3 | B | | | 16.00 | 100 | 6147 | 203 | 76 | 0.44 | 1.42 |
| 4 | A | 26000 | 54600 | 16.00 | 105 | 4390 | 160 | 91 | — | |
| 5 | C | 28900 | 60700 | 20.25 | 95 | 6444 | 239 | 45 | 0.33 | 2.20 |
| 6 | B | 28200 | 62200 | 20.25 | 100 | 6532 | 240 | 53 | 0.24 | 2.41 |
| 7 | C | 29600 | 67300 | 25.00 | 105 | 8590 | 338 | 45 | 0.31 | 2.11 |
| 8 | A | | | 20.25 | 105 | 4878 | 144 | 56 | | |
| 9 | A | 28000 | 60000 | 20.25 | 105 | | | | 0.16 | |

The results show that at higher stretch ratios the barrier properties improve. The results further show that when the total stretch ratio is at least 4.0×4.0, the tensile strength is above 140 MPa and the tensile modulus is above 4,000 MPa. The highest tensile strength and tensile modulus as well as the best barrier properties are obtained for a film prepared by stretching at total stretch ratios above 16 (i.e. above 4×4).

Comparative Experiment

The ground and dried PET resin particles described in Example 2 were subjected to a similar treatment as the treatment of the PEF resin samples in Example 2. The results of the films obtained are shown in Table 4.

TABLE 4

| PET sample | Stretch ratio | Stretch temp., ° C. | Tensile modulus, MPa | Tensile strength, MPa | Elongation at break, % | permeability, cc * mm/m$^2$ * day * atm | |
|---|---|---|---|---|---|---|---|
| | | | | | | O$_2$ | CO$_2$ |
| 1 | 12.25 | 95 | 3977 | 174 | 111 | 3.08 | 27.6 |
| 2 | 16.00 | 95 | 5334 | 241 | 90 | 3.23 | 24.9 |
| 3 | 16.00 | 100 | 4465 | 199 | 112 | 2.52 | 26.0 |

Comparison of the results in Tables 3 and 4 shows that in particular the barrier properties of PEF films are greatly enhanced compared to comparable PET films. Whereas for bottles a five-fold improvement of the oxygen barrier properties was found, the improvement of the oxygen permeability for films can be as high as by a factor of about 8. The CO$_2$ barrier properties are even more improved; for PEF bottles the CO$_2$ barrier properties were found to be two-fold better than for PET bottles. For PEF films the improvement of the CO$_2$ barrier properties over PET films is well above 8 times.

Example 3

The films of PEF samples 1 to 7 were further tested for thickness and shrinkage. The shrinkage test was done by cutting a square of the film with known dimensions and then placing the film into hot glycerol at a temperature of 90, 120 or 150° C. for 20 seconds in accordance with the procedures of ASTM D2732-8. The films were removed and the dimensions were re-measured. The average shrinkage in each direction was measured. The results are shown in the Table 5 below.

To show the effect of a heat-setting step on the shrinkage performance of a film a comparison was made between the shrinkage behavior of samples 8 and 9, which originate from the same PEF resin, have been stretched with the same stretch ratio and at the same temperature. Only sample 9 has been subjected to heat setting. Table 5 shows the results.

TABLE 5

| Sample | Thickness, μm | Shrinkage at 90° C., % | Shrinkage at 120° C., % | Shrinkage at 150° C., % |
|---|---|---|---|---|
| 1 | 145 | 42 | 64 | 62 |
| 2 | 101 | 45 | 53 | 59 |
| 3 | 113 | 29 | 35 | 47 |
| 4 | 128 | 9 | 48 | 49 |
| 5 | 91 | 9 | 55 | 64 |
| 6 | 99 | 1 | 27 | 46 |
| 7 | 76 | 1 | 24 | 41 |
| 8 | about 95 | — | 32 | 45 |
| 9 | 89 | — | 3 | 2 |

The results show that at higher stretch ratios the shrinkage typically decreases. Comparison of the results between samples 8 and 9 shows that the film that was subjected to a heat setting step under tension had dramatically reduced shrinkage behavior.

The invention claimed is:

1. A process for producing an oriented film comprising poly(ethylene-2,5-furandicarboxylate) which oriented film has a tensile modulus of at least 2,000 MPa, a tensile strength before break of at least 125 MPa and an oxygen permeability of at most 0.7 cc-mm/m2*day*atm, at 0% relative humidity and at 23 ° C., determined according to ASTM D-3985, which process comprises:

preparing a sheet from a poly(ethylene-2,5-furandicarboxylate) resin by heat processing which sheet has a thickness of at most 2.5 mm;
allowing the sheet to cool; and
stretching the cooled sheet in at least one direction with a stretch ratio of at least 4/1 at a temperature in the range of 90 to 130 ° C. to yield the oriented film,
wherein the poly(ethylene-2,5-furandicarboxylate) in the poly(ethylene-2,5- furandicarboxylate) resin has a weight average molecular weight in the range of 60,000 g/mol to 250,000 g/mol and a glass transition temperature of at most 90 ° C. and consists of included comonomers ethylene glycol and 2,5-furandicarboxylic acid and wherein the poly(ethylene-2,5- furandicarboxylate) in the oriented film has a weight average molecular weight in the range from 55,000 to 100,000 g/mol.

2. The process according to claim 1, wherein the heat processing comprises extrusion and/or compression molding.

3. The process according to claim 1, wherein the heat processing is carried out by compression molding at a temperature in the range of 245 to 265° C.

4. The process according to claim 1, wherein the heat processing is carried out by extrusion at a temperature in the range of 230 to 280° C.

5. The process according to claim 4, wherein the extrusion uses a die which is flat or annular.

6. The process according to claim 4, wherein the stretching of the cooled sheet is conducted by accelerating the sheet along one or more sets of rollers.

7. The process according to claim 4, wherein the extrusion process is a coextrusion process to obtain a multilayer structure.

8. The process according to claim 1, wherein the stretching is done with a draw ratio of at least 4 to form a uniaxially oriented film.

9. The process according to claim 8, wherein the uniaxially oriented film is stretched in a second direction using a tenter-frame.

10. The process according to claim 1, wherein the stretching of the cooled sheet is conducted in a blown film apparatus.

11. The process according to claim 1, wherein the sheet has a thickness in the range of 0.1 to 2.0 mm.

12. The process according to claim 1, wherein said cooling is conducted to a temperature below 130° C.

13. The process according to claim 1, wherein said stretching is conducted in at least two directions.

14. The process according to claim 13, wherein said stretching is conducted in one direction with a stretch ratio of at least 3.0 and in a second direction with a stretch ratio of at least 3.0.

15. The process according to claim 14, wherein said stretching is conducted in the one direction with a stretch ratio above 4.0 and in the second direction with a stretch ratio of above 4.0.

16. The process according to claim 15, wherein said stretching is conducted in the one direction with a stretch ratio in the range of 4.2 to 5.5 and in the second direction with a stretch ratio in the range of 4.2 to 8.0.

17. The process according to claim 13, wherein the at least two directions in which said stretching is conducted are two directions which are perpendicular to each other.

18. The process according to claim 1, wherein said stretching is conducted in two or more directions simultaneously or sequentially.

19. The process according to claim 1, wherein said stretching is conducted at a temperature in the range of 92 to 128° C.

20. The process according to claim 1, further comprising heating the oriented film after said stretching, said heating conducted to a temperature of 140 to 210° C. while maintaining the oriented film under restraint.

21. The process according to claim 20, wherein said heating is done while maintaining the oriented film under restraint with the help of an extension to a tenter-frame stretching apparatus.

22. The process according to claim 1, wherein the poly(ethylene2,5-furandicarboxylate) resin comprises one or more other polymers and additives in addition to the poly(ethylene2,5-furandicarboxylate) of the resin.

23. The process according to claim 22, wherein the one or more other polymers are selected from the group consisting of poly(ethylene terephthalate), nylon-6, nylon-6,6, polyolefins, block copolymers of styrene and butadiene and/or isoprene, and combinations thereof.

24. The process according to claim 22, wherein the one or more additives are selected from the group consisting of basic compounds and/or ammonium compounds capable of suppressing the formation of diethylene glycol, plasticizers, softeners, dyes, antioxidants, oxygen scavengers, UV-stabilizers, fillers, and combinations thereof.

* * * * *